March 5, 1929.  C. L. CAMERON  1,703,988
SWITCH FOR ELECTRICAL APPLIANCES
Filed June 17, 1927
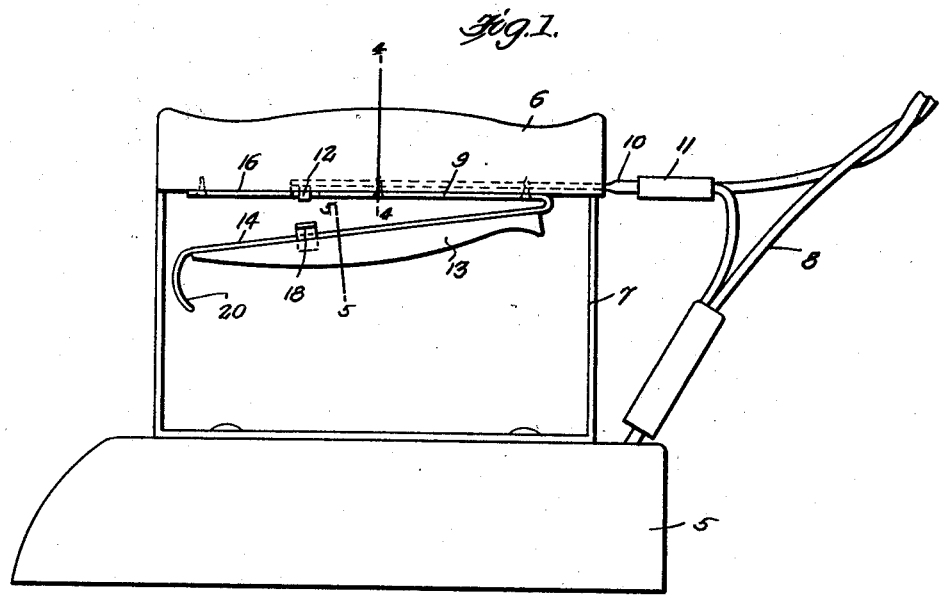
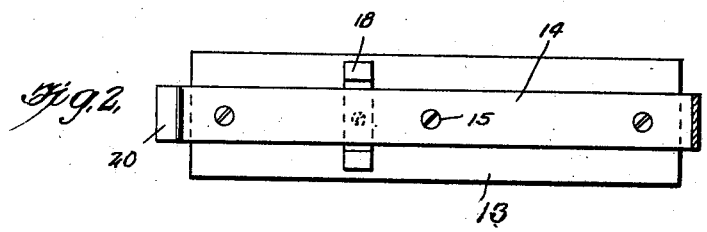
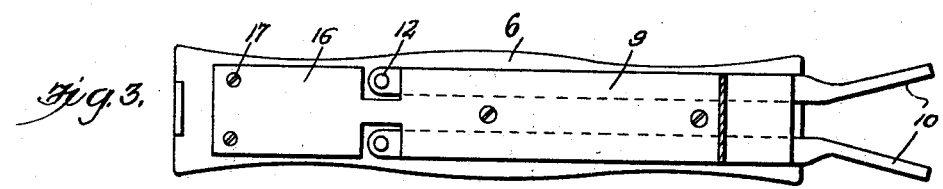
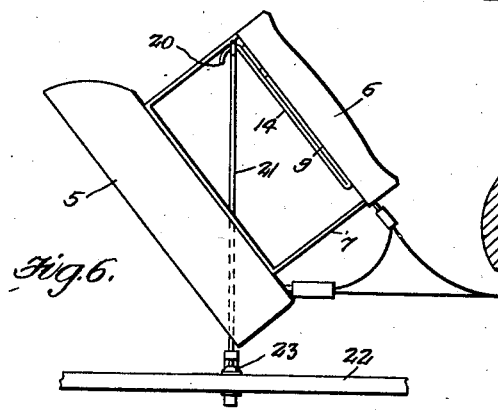
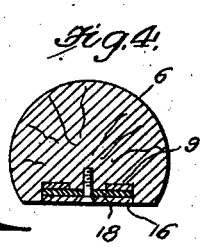
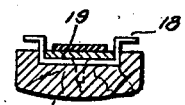
Inventor
C. L. Cameron,
By Clarence A. O'Brien
Attorney Patented Mar. 5, 1929.

1,703,988

UNITED STATES PATENT OFFICE.

CHARLES L. CAMERON, OF DAYTON, OHIO.

SWITCH FOR ELECTRICAL APPLIANCES.

Application filed June 17, 1927. Serial No. 199,533.

My invention relates to switches for electrical appliances such as electric irons or the like and has for its principal object to mount a switch upon the handle of the device so that upon the gripping of the handle by the operator the switch will be closed so as to connect the heating element located in the appliance with the electric circuit.

My invention is adapted particularly for use in connection with electric irons but may also be conveniently used in connection with any portable electric appliance provided with a handle for carrying the same.

Another object of the invention is to provide a switch arm normally maintained in open position while the appliance is out of use, and attached to the handle of the appliance so that upon the gripping of the handle in a natural manner the switch arm will be moved into a closed position whereby to cause the heating of the appliance.

It is also an object of the invention to provide a switch of this character mounted upon the handle of an electric appliance and adapted to be suspended upon a support with the switch arm either in open or closed position as desired and at the same time retaining the appliance out of engagement with the work.

By providing a switch of this character adapted to support the appliance out of contact with the work while the switch is either open or closed the appliance may thus be hung out of harm's way while the same is being heated and without requiring the attendance of the operator. By this arrangement the danger of causing fires by an overheated appliance is greatly reduced.

Other objects and advantages reside in the special construction, combination and arrangement of the various elements forming the invention as more fully hereinafter described and claimed, reference being had to the accompanying drawings forming part hereof, wherein:

Figure 1 is an elevational view showing an electric iron provided with a switch constructed in accordance with my invention, Figure 2 is a top plan view of the movable switch arm, Figure 3 is a bottom plan view of the stationary switch plate mounted on the handle, Figure 4 is a vertical sectional view taken along a line 4—4 of Figure 1, Figure 5 is a similar view taken along a line 5—5 of Figure 1, and, Figure 6 is a view in elevation showing the appliance suspended from a support with the switch in closed position.

Referring now to the drawing I have disclosed my invention adapted for use in connection with an electric iron although it is to be understood that the device may be used with equal facility upon many other types of appliances. The electric iron is shown comprising a heating plate indicated at 5 above which is arranged a handle 6 suitably supported by vertically extending standards 7. Electric wires 8 extend to the base of the iron for connection with the heating element arranged therein, said wires having a switch interposed therein comprising a pair of longitudinally arranged rods 9 secured to the underside of the handle and arranged in parallel relation with one end thereof extending outwardly from the rear of the handle and constituting contact fingers 10 adapted to be inserted in a plug connection 11 whereby to connect the same with the electric circuit. The opposite ends of the rods 9 are provided with contact members 12 extending slightly downwardly below the lower edge of the handle 6.

A finger grip 13 is arranged to extend longitudinally below the handle 6 and is connected to the handle by means of one end of a spring steel plate indicated at 14 secured to the upper side of the finger grip as by means of screws 15 or the like and having its opposite end bent backwardly upon itself in spaced relation therefrom as indicated at 16 and secured to the underside of the handle as by means of screws 17 or the like. A strip of insulation material indicated at 18 is interposed between the plate section 16 and the rods 9 to prevent contact therewith and along each edge of the section 16 of the plate I provide cut-out portions through which the contact members 12 are downwardly extended. The material from which the sections 14 and 16 of the plate are constructed is of a suitable resilient character to normally permit the weight of the finger grip 13 to retain the same in a downward position out of contact with the upper section of the plate 16 but at the same time permitting the same to be readily moved into contact with each other.

A contact member 18 is carried by the finger grip 13 and arranged immediately below the contact members 12 carried by the handle, said contact member 18 being retained on the finger grip by means of the section 14 of the plate and suitably insulated therefrom as at 19. It is therefore apparent that the switch formed between the various contact members may be opened or closed by moving the finger grip upwardly or downwardly.

The end of the section 14 of the plate extends outwardly beyond the finger grip 13 and is formed into a hook 20 whereby to permit the same to be suspended from a vertically extending support 21 adapted to be secured to a suitable work table indicated at 22 by a clamp 23 as shown in Figure 6 of the drawing. In this manner the appliance may be suspended above the work and out of engagement therewith and at the same time permits the switch to be closed for the heating of the appliance. It is further apparent that the appliance may likewise be suspended with the switch in open position merely by attaching the supports 21 at the rear end of the handle rather than at the front end thereof.

It is obvious that the invention is susceptible to various changes and modifications without departing from the spirit thereof or the scope of the appended claims and I accordingly claim all such forms of the device to which I am entitled.

I claim:—

1. In an electric switch for electrical appliances comprising a handle mounted on the appliance, a pair of rods arranged longitudinally at the under side of the handle and having electrical contact members at one end of each thereof, a spring-pressed plate secured at one end to the handle and having its opposite ends arranged substantially parallel thereto, for movement into engagement therewith, and contact members carried by the free ends of the plate and engageable with the contact members of said handle upon the movement of the free end of the plate toward its secured end.

2. In a switch for electric appliances comprising a handle mounted thereon, and having a pair of electrical connectors extending longitudinally therebeneath with one end of each of said connectors terminating in contact members, a plate having one end secured beneath the handle with its opposite end bent downwardly and backwardly upon itself, a finger grip secured to the opposite end of the plate, contact members carried by the finger grip and adapted to be moved into engagement with said first named contact member, a supporting hook formed at the end of the plate connected with said finger grip and arranged to suspend the appliance from a support with the contact members in engaged position.

In testimony whereof I affix my signature.

CHARLES L. CAMERON.